(12) United States Patent
Kasai

(10) Patent No.: US 7,859,555 B2
(45) Date of Patent: Dec. 28, 2010

(54) IMAGE FORMING APPARATUS

(75) Inventor: Tadashi Kasai, Tokyo (JP)

(73) Assignee: Oki Data Corporation, Tokyo (JP)

( * ) Notice: Subject to any disclaimer, the term of this patent is extended or adjusted under 35 U.S.C. 154(b) by 509 days.

(21) Appl. No.: 11/324,498

(22) Filed: Jan. 3, 2006

(65) Prior Publication Data

US 2006/0152572 A1 Jul. 13, 2006

(30) Foreign Application Priority Data

Jan. 11, 2005 (JP) .............................. 2005-003827

(51) Int. Cl.
*B41J 2/385* (2006.01)
(52) U.S. Cl. .................................................... 347/130
(58) Field of Classification Search ................ 347/130, 347/237; 348/536; 341/101
See application file for complete search history.

(56) References Cited

U.S. PATENT DOCUMENTS

| 5,200,763 | A | * | 4/1993 | Tanuma et al. .............. 347/237 |
| 6,198,496 | B1 | | 3/2001 | Wakasugi |
| 6,559,892 | B1 | * | 5/2003 | Kikuchi ...................... 348/536 |
| 6,866,367 | B2 | * | 3/2005 | Szumla ........................ 347/50 |
| 6,970,116 | B2 | * | 11/2005 | Masaki ........................ 341/101 |
| 2002/0118269 | A1 | * | 8/2002 | Sato ............................ 347/237 |
| 2004/0183916 | A1 | * | 9/2004 | Enomoto et al. ......... 348/207.99 |

FOREIGN PATENT DOCUMENTS

| JP | 2246499 A | 10/1990 |
| JP | 11-034394 A | 2/1999 |
| JP | 11122636 A | 4/1999 |
| JP | 2001353900 A | 12/2001 |
| JP | 2004029963 A | 1/2004 |

* cited by examiner

*Primary Examiner*—Stephen D Meier
*Assistant Examiner*—Carlos A Martinez, Jr.
(74) *Attorney, Agent, or Firm*—Panitch Schwarze Belisario & Nadel LLP

(57) ABSTRACT

An image forming apparatus according to this invention prevents adverse effects on peripheral circuits and speeds up data transfer by preventing a mutual interference among signals. In the image forming apparatus, a transfer controller which converts into a differential serial data pair (data+/−) multiplex data td [6:0] multiplexed from head data vd [7:0], a head control signal vctl [3:0], a data enable signal dten, and a control enable signal cten, converts as well a clock signal clk into a differential clock signal pair (clk+/−), and transfers those differential serial data pair and differential clock signal pair to an LED head via a cable. The LED head receives both of the differential serial data pair and the differential clock signal pair to separate those pairs into head data hd [7:0], head control signal hctl [3:0], and data transfer clock hclk.

4 Claims, 13 Drawing Sheets

FIG. 4

| | FIRST COLUMN | SECOND COLUMN | | THIRD COLUMN | FOURTH COLUMN | FIFTH COLUMN | SIXTH COLUMN |
|---|---|---|---|---|---|---|---|
| | STATUS INPUT SIGNAL | DATA TRANSFER ODD NUMBER OF TIMES | EVEN NUMBER OF TIMES | PORT CONTROL | STATUS HOLDING (nop) | SOFT RESET | SERIAL DATA WIRE |
| FIRST ROW | SOFT RESET | 0 | | 0 | 0 | 1 | |
| SECOND ROW | dten | 1 | | 0 | 0 | – | |
| THIRD ROW | cten | 0 | | 1 | 0 | – | |
| FOURTH ROW | | 1 | 1 | 0 | 0 | 0 | d6 |
| FIFTH ROW | | – | – | 1 | 0 | – | d5 |
| SIXTH ROW | | – | – | 1 | 1 | 0 | d4 |
| SEVENTH ROW | | DATA3 | DATA7 | ctl3 | – | – | d3 |
| EIGHTH ROW | | DATA2 | DATA6 | ctl2 | – | – | d2 |
| NINTH ROW | | DATA1 | DATA5 | ctl1 | – | – | d1 |
| TENTH ROW | | DATA0 | DATA4 | ctl0 | – | – | d0 |

– INDICATES ARBITRARY FIXED VALUE

FIG. 8

| | Status Input Signal (First Column) | Data Transfer (Second Column) | | Port Control (Third Column) | Status Holding (nop) (Fourth Column) | Soft Reset (Fifth Column) | Serial Data Wire (Sixth Column) |
|---|---|---|---|---|---|---|---|
| | | Odd Number of Times | Even Number of Times | | | | |
| First Row | SOFT RESET | 0 | | 0 | 0 | 1 | |
| Second Row | dten | 1 | | 0 | 0 | — | |
| Third Row | cten | 0 | | 1 | 0 | — | |
| Fourth Row | | — | — | — | — | — | d9 |
| Fifth Row | | — | — | — | — | — | d8 |
| Sixth Row | | — | — | — | — | 0 | d7 |
| Seventh Row | | 1 | 1 | 0 | 0 | — | d6 |
| Eighth Row | | — | — | 1 | 1 | 0 | d5 |
| Ninth Row | | — | — | 1 | — | — | d4 |
| Tenth Row | | DATA3 | DATA7 | ctl3 | — | — | d3 |
| Eleventh Row | | DATA2 | DATA6 | ctl2 | — | — | d2 |
| Twelfth Row | | DATA1 | DATA5 | ctl1 | — | — | d1 |
| Thirteenth Row | | DATA0 | DATA4 | ctl0 | — | — | d0 |

IMAGE FORMING APPARATUS

BACKGROUND OF THE INVENTION

1. Field of the Invention

This invention relates to an image forming apparatus and, more particularly, to a multiplexing mechanism for transferring data on an exposure head from an image processing section to the exposure head.

2. Description of Related Art

In an image forming apparatus with use of an exposure head composed of a light emitting element array such as a light emitting diode (LED) array, data on the exposure head are generated at an image processing section and then transferred sequentially to the exposure head in order to be exposed. The image processing section and the exposure head are connected via a flexible cable composed of a flexible printed wiring board to transfer such parallel data on the exposure head as composed of multiple bits (i.e., four bits), a clock signal for triggering transfer or exposure of the data, and a control signal via different signal wires in parallel, respectively (see, e.g., Japanese Patent Laid-Open No. H11-34394).

Recent image forming apparatuses are required to improve more in speed and resolution. In association with the improvement in speed and resolution, the image forming apparatuses tend to have an increased mutual interference problem among the aforementioned signal wires or radiated noise problem. As a result, there have been inevitable problems such as extraordinary signal transmission due to the mutual interference among the signals, malfunction of peripheral circuits inside the apparatus due to generation of the radiated noise, and adverse effects on an exterior of the apparatus, or the like.

Problem to be solved is that excessive digital noise is generated to cause malfunction or peripheral circuits inside the apparatus or to become such EMI noise (radiated noise) as having the adverse effects on the exterior of the apparatus since the parallel data on the exposure head composed of multiple bits, the clock signal for triggering transfer or exposure of the data, and the control signal are respectively transferred via different signal wires.

SUMMARY OF THE INVENTION

An image forming apparatus according to this invention is characterized particularly in that a transfer controller converts an exposure head data received in parallel and a predetermined control signal into multiplex data of multiple bits and further converts the multiplex data into a differential serial data pair while converting a clock signal upon reception thereof into a differential clock signal pair, and transfers the differential serial data pair and the differential clock signal pair to the exposure head via a predetermined shielded cable.

The image forming apparatus according to this invention transfers the differential serial data pair and the differential clock signal pair from the transfer controller to the exposure head via the predetermined shielded cable, such that the noise generated from the predetermined shielded cable deteriorates in a noise level while remarkably decreasing in the number of generation series of such noises as coinciding at the same timing. As the result, it is possible to reduce irregularities in signal transfer due to mutual interference among the signals, malfunction of peripheral circuits inside the apparatus due to generation of the radiated noise, adverse effects on the exterior of the apparatus, or the like. Furthermore, the image forming apparatus according to this invention converts into serial data the data multiplexed from the exposure head data and the control signal to transfer the serial data, thereby producing such effects that the number of the signal wires as a generation source of the noises coinciding at the same timing is decreased to enable the data to be transferred at higher speed.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein;

FIG. 4 is an illustration of multiplex rules on a multiplex section according to the first embodiment;

FIG. 8 is an illustration of multiplex rules on a multiplex section according to the second embodiment;

DETAILED DESCRIPTION OF PREFERRED EMBODIMENTS OF THE INVENTION

Radiated noises can be reduced by using as a cable for connecting the transfer controller to the exposure head a shielded cable containing inside thereof two pairs of twisted-pair cables each having a shielded interior thereof and predetermined characteristic impedance, whereas reflection noises can be suppressed from generating at distal ends of the cable such that an effect of suppressing noises can be further improved by matching the impedance at both distal ends with respect to connections between the transfer controller and the cable and between the cable and the exposure head.

First Embodiment

In the image forming apparatus according to this invention, the transfer controller converts the exposure head data received in parallel and the predetermined control signal into the multiplex data of multiple bits and further converts the data into the differential serial data pair while converting the clock signal upon reception, into the differential clock signal pair. The transfer controller then transfers the differential serial data pair and the differential clock signal pair to an LED head as the exposure head via two pairs of the twisted-pair cables.

Figure 1:
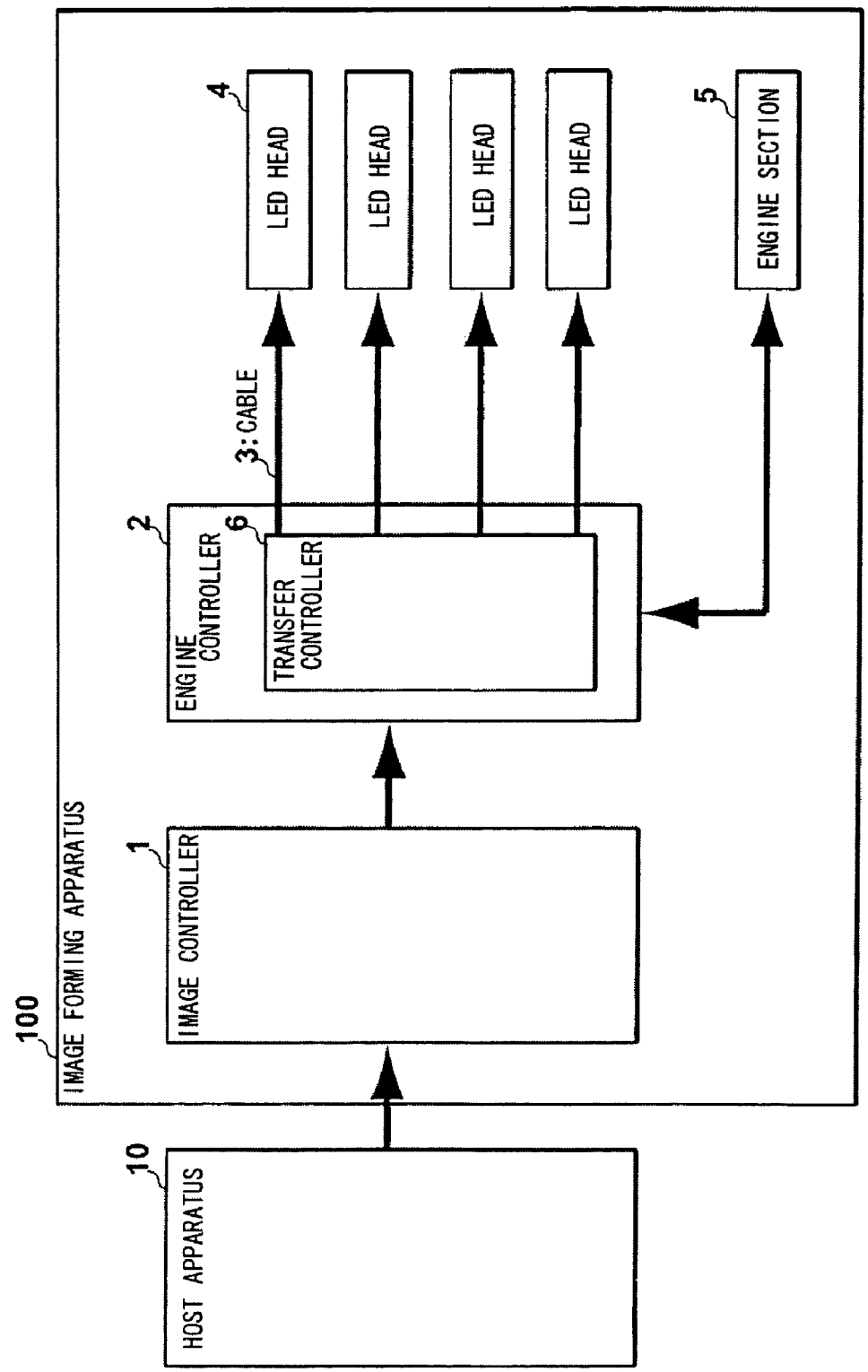
FIG. 1 is a schematic view showing an image forming apparatus according to a first embodiment.

FIG. 1 is a schematic view of the image forming apparatus according to the first embodiment. As shown in FIG. 1, an image forming apparatus 100 according to the first embodiment includes an image controller 1, an engine controller 2, cables 3, four LED heads 4, and an engine section 5. The image controller 1 receives an image formation command from a host apparatus 10 such as a PC (Personal Computer) or the like, interprets the command, develops the command into data, and forms image data for every color (i.e., four colors of black, yellow, magenta, and cyan). The image forming apparatus 100 transfers in parallel the image data composed of multiple bits, a clock signal for triggering transfer or export, and a control signal to the engine controller 2 via different signal wires, respectively.

The engine controller 2 controls a mechanism part such as a motor of the engine section 5 and a process for forming an electrophotography. A transfer controller 6 contained inside the engine controller 2 receives the image data from the image controller 1 and then generates the exposure head data and the control signal. The transfer controller 6 also serves as a circuit block that multiplexes those data and signals and then converts the multiplexed data from parallel to serial to transfer the converted data as a differential serial data pair (data+/−) and a differential clock signal pair (clk+/−) to four LED heads 4 via four cables 3 for four colors, respectively.

Figure 2:
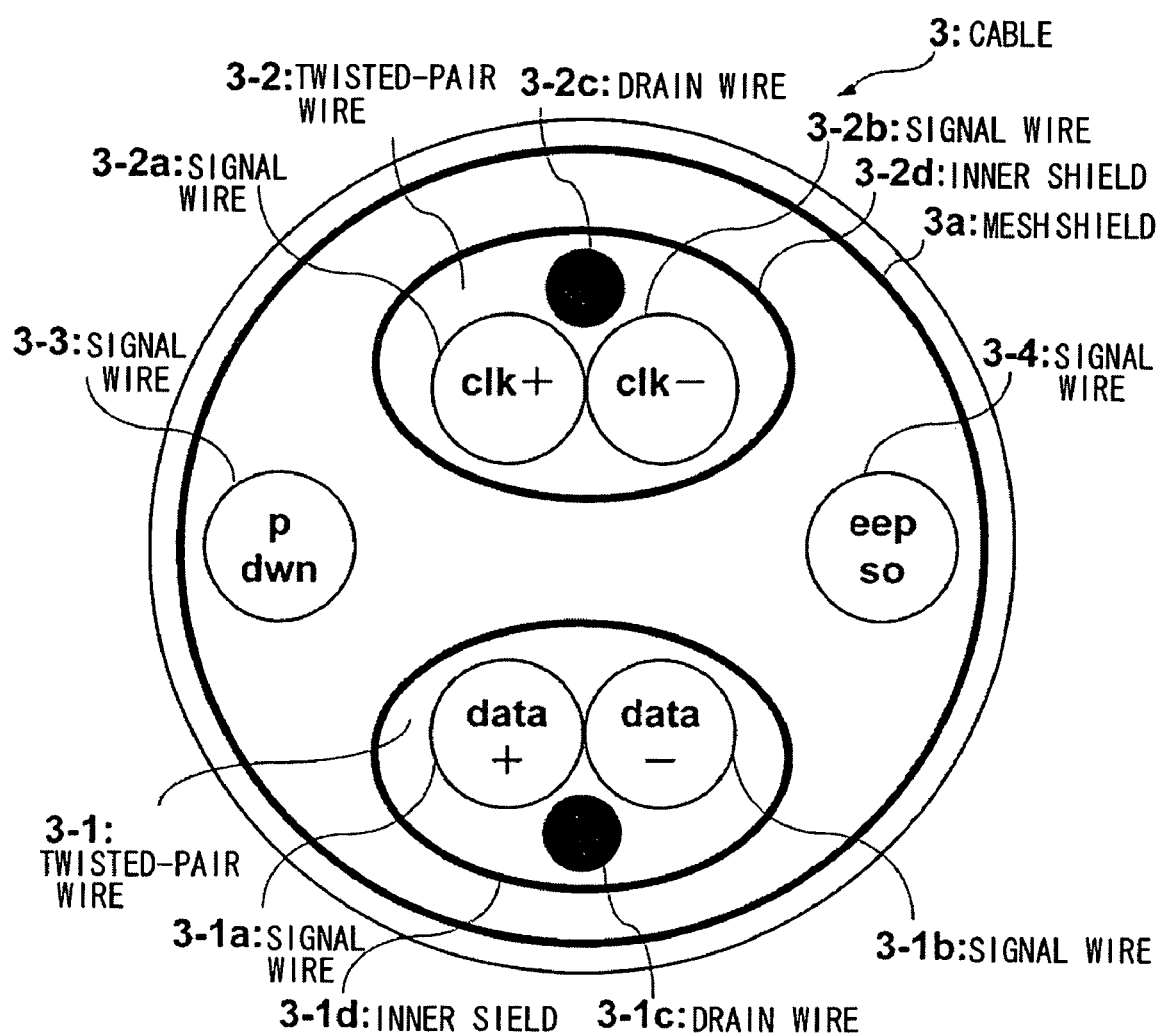
FIG. 2 is a cross-sectional view of a cable according to the first embodiment.

The cables 3 are signal cables for connecting the transfer controller 6 contained inside the engine controller 2 to four LED heads 4, respectively. An inner structure of the cable is described hereinafter. FIG. 2 is a cross-sectional view of a cable according to the first embodiment. As shown in FIG. 2, the cable 3 used in the first embodiment contains inside thereof twisted-pair wires 3-1, 3-2 and signal wires 3-3, 3-4, in which an outer circumference of the cable 3 is shielded by a mesh shield 3a. The twisted-pair wire 3-1 is composed of signal wires 3-1a, 3-1b, a drain wire 3-1c, and an inner shield 3-1d for shielding both of the signal wires 3-1a, 3-1b. The signal wire 3-1a transfers the differential serial data data+ while the signal wire 3-1b transfers the differential serial data data−, and the drain wire 3-1c has both distal ends thereof connected to earth wires of the transfer controller 6 and the LED head 4 shown in FIG. 1, respectively, for the sake of eliminating noise components.

The twisted-pair wire 3-2 is composed of signal wires 3-2a, 3-2b, a drain wire 3-2c, and an inner shield 3-2d for shielding both of the signal wires 3-2a, 3-2b. The signal wire 3-2a transfers the differential clock signal clk+ while the signal wire 3-2b transfers the differential clock signal clk−, and the drain wire 3-2c has both distal ends thereof connected to earth wires of the transfer controller 6 and the LED head 4 shown in FIG. 1, respectively, for the sake of eliminating the noise components. The signal wire 3-3 transfers a power-down signal pdwn described later whereas the signal wire 3-4 transfers a signal eep-so described later.

As for FIG. 1 again, the LED head 4 receives the differential serial data pair (data+/−) and the differential clock signal pair (clk+/−) from the transfer controller 6 via the cable 3 and inversely converts those pairs into the image data, control data, and clock signal to expose desired images onto a photosensitive drum.

The engine section 5 is a mechanism part that conveys a printing medium under a control by the engine controller 2, reproduces on the photosensitive drum the image exposed with the LED head, and then fuses the image onto the printing medium to output the image.

Figure 3:
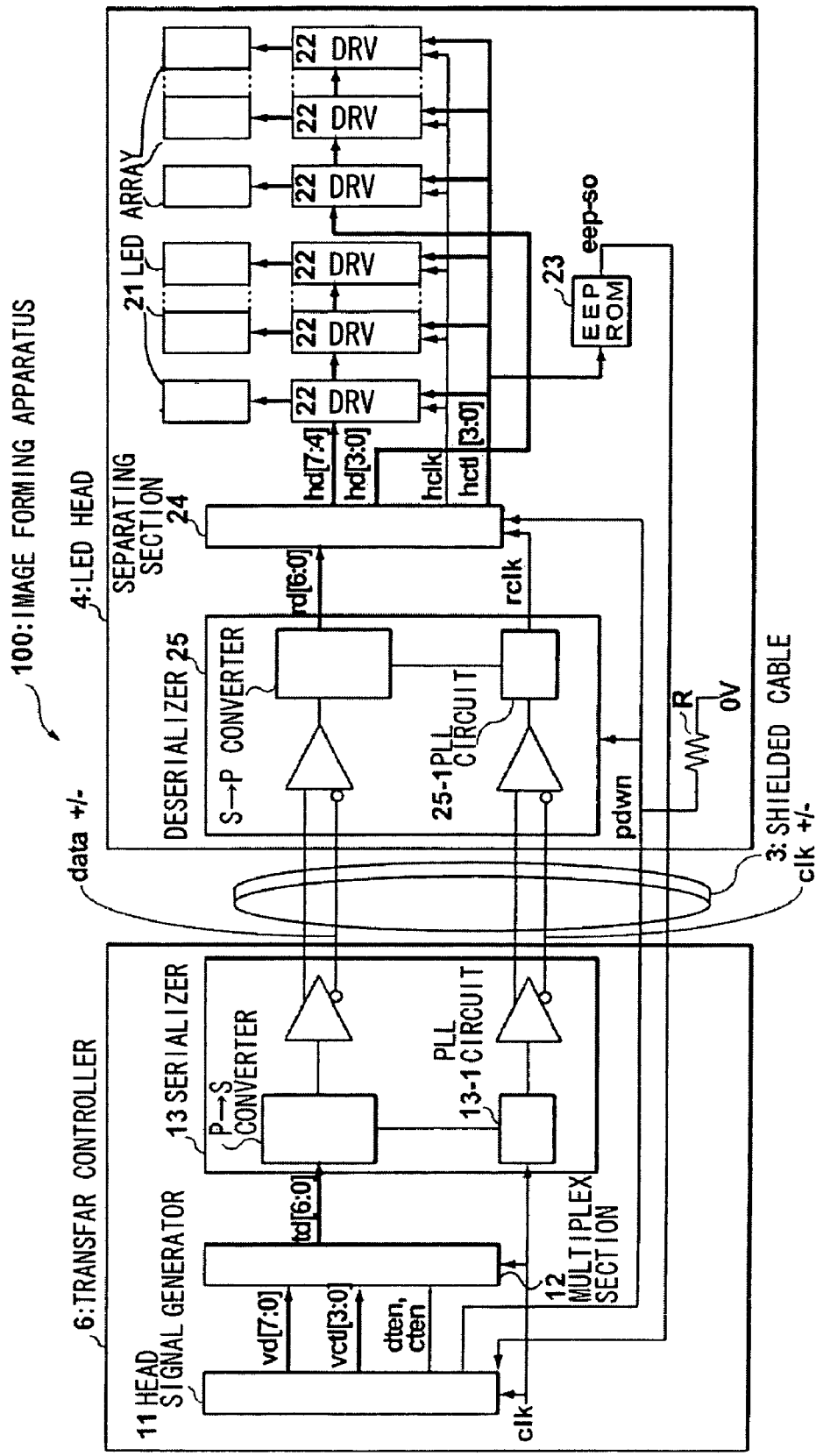
FIG. 3 is a schematic view showing an essential function of the image forming apparatus according to the first embodiment.

Next, the transfer controller 6 and the LED head 4 are described in detail with the focus on functions thereof. FIG. 3 is an illustration of an essential function of the image forming apparatus according to the first embodiment. FIG. 3 is a functional block showing function of only one color arbitrarily chosen among four-color system composed of black, yellow, magenta, and cyan. As shown in FIG. 3, in the image forming apparatus 100 according to the first embodiment, the differential serial data pair (data+/−) and the differential clock signal pair (clk+/−) are transferred from the transfer controller 6 to the LED head 4 via the cable 3. Furthermore, the power-down signal pdwn is transferred from the transfer controller 6 to the LED head 4 via the cable 3, whereas the signal eep-so is transferred from the LED head 4 to the transfer controller 6 via the cable 3. In the meanwhile, one end of apdwn signal wire is connected to a grounded resistor R to be pulled down inside the LED head 4.

The transfer controller 6 is, as above described, defined as one circuit block composing the engine controller 2 shown in FIG. 1 and contains inside thereof a head signal generator 11, a multiplex section 12, and a serializer 13. The head signal generator 11 is composed of a buffer for storing as many as a plurality of lines the image data received from the image controller 1 shown in FIG. 1, a pointer for writing in the buffer, a pointer for reading out of the buffer, and a state machine for controlling those pointers and for generating a head control signal for each line.

Furthermore, the head signal generator 11 generates head data vd [7:0] of eight bits and a head control signal vctl [3:0] of four bits from the image data and further generates a data enable signal dten for indicating a status of the state machine and a control enable signal cten. Herein, the data enable signal dten is such a signal that is equal to one while the data transferred to the LED head 4 are effective, whereas the control enable signal cten is such a signal that is equal to one only at a time when the head control signal vctl [3:0] changes.

The multiplex section 12 receives in parallel the head data vd [7:0], the head control signal vctl [3:0], the data enable signal dten, and the control enable signal cten to produce an output upon converting those data and signals into the multiplex data td [6:0] of seven bits. The multiplex section executes this multiplexing process in accordance with predetermined rules previously set up. One example of the rule is described hereinafter.

FIG. 4 is an illustration of multiplex rules on a multiplex section according to the first embodiment. In FIG. 4, the first row describes an input signal and varieties of a packet generated upon a multiplexing process, or namely "contents of a signal". That is, the first column describes a status input signal, the second column describes a data transfer signal, the third column describes a port control signal, the fourth column describes a status holding (nop, i.e., no operation instruction) signal, the fifth column describes a soft reset signal, and the sixth column describes a serial data wire. A content of the signal to be multiplexed is set up according to a combination of input signals, i.e., the soft reset signal, the data enable signal dten, and the control enable signal cten respectively described in the first to third rows. For example, in a case of the soft reset signal in an off-status (0), the data enable signal dten equal to one, and the control enable signal cten equal to zero, the input signal is defined as zero one zero, whereby the multiplex data td [6:0] to be output indicates the data transfer signal in the second column.

In a case of a main scanline of an odd number of times, four low-order bits, i.e., data 0 to data 3, of the head data vd [7:0] are output as the multiplex data td [6:0] to the serial data wires (in the sixth column) d0 to d3 in the tenth to seventh rows, respectively. In a case of the main scanline of an even number of times at that time, four high-order bits, i.e., data 4 to data 7, of the head data vd [7:0] are output in order as the multiplex data td [6:0] to the serial data wires (in the sixth column) d0 to d3 in the tenth to the seventh rows, respectively. Herein, the odd number of times means the odd number of times when the image data are transferred, whereas the even number of times means the even umber of times when the image data are transferred. One line of the image data is transferred upon divided into the data of the odd number of times and the data of the even number of times but restructured inside the LED head 4, thereby being exposed as one main scanline.

As for FIG. 3 again, the serializer 13 receives (in parallel) the multiplex data td [6:0] from the multiplex section 12 to convert the data from parallel to serial, i.e., to the differential serial data pair (data+/−), thereby outputting the differential serial data pair while receiving the clock signal clk from the image controller 1 shown in FIG. 1 to convert the signal into the differential clock signal pair (clk+/−), thereby outputting the differential clock signal pair. Herein, the differential serial data pair (data+/−) indicates such a signal status that both of the serial data data+ and data− are output to two signal wires (exemplified as the twisted-pair line 3-1 shown in FIG. 2) at the same timing, in which the multiplex data (parallel data) received from the multiplex section 12 is converted into the serial data data+ and the serial data data− are obtained by generating a signal having an opposite polarity to the serial data data+.

In the same way, the differential clock signal pair (clk+/−) indicates such a signal status that both of the clock signals clk+ and clk− are output to two signal wires (herein exemplified as the twised-pair wire 3-2 in FIG. 2) at the same timings, in which the clock signal clk+ is obtained in a manner that the clock signal received from the image controller 1 is multiplied to a predetermined frequency using a PLL (Phase-Locked Loop) circuit 13-1 while being brought in sync with the multiplex data, and the clock signal clk− is obtained by generating a signal having an opposite polarity to the clock signal clk+.

The LED head 4 receives the differential serial data pair (data+/−) and the differential clock signal pair (clk+/−) from the serializer 13 via the cable 3 already described in detail in reference to FIG. 2 to expose the desired image onto the photosensitive drum. The LED head 4 contains inside thereof a deserializer 25, a separating section 24, an EEPROM (Electrically Erasable and Programmable Read Only Memory) 23, a driver (DRV) 22, and an LED array 21.

The deserializer 25 receives the differential serial data pair (data+/−) from the serializer 13 via the cable 3 and inversely converts the data pair into multiplex (recovery) data rd [6:0] to output the data. At the same time, the deserializer 25 receives the differential clock signal pair (clk+/−) from the serializer 13 via the cable 3 and inversely converts the signal pair into the clock signal clk to multiply the clock signal clk to a predetermined repetition frequency, thereby outputting the multiplied clock signal as a clock (recovery) signal rclk in synchronism with the multiplex (recovery) data rd [6:0].

The separating section 24 receives the multiplex (recovery) data rd [6:0] of seven bits from the deserializer 25 and then separates the data into four low-order bits of the head data hd [3:0], four high-order bits of the head data hd [7:4], and the control signal [3:0], thereby outputting those data and signal. The separating section 24 also outputs data transfer clock hclk upon reception of the clock (recovery) signal rclk from the deserializer 25. Furthermore, the separating section 24 receives the power-down signal pdwn from the head signal generator 11 via the cable 3. This signal is pulled down at an input end of the LED head 4.

Herein, the separation of the multiplex (recovery) data rd [6:0] of seven bits into four low-order bits of the head data hd [3:0], four high-order bits of the data head hd [7:4], and the control signal [3:0] is executed in accordance with the rules described in FIG. 4, in reverse order from operation of the multiplex section 12. In substantially the same manner as described in description for the multiplex section 12, for example, in a case of the soft reset signal in an off-status (0), the data enable signal dten equal to one and the control enable signal cten equal to zero, the input signal is defined as zero one zero, whereby the multiplex (recovery) data rd [6:0] to be received indicates the data transfer signal in the second column.

In a case of the data transfer of the odd number of times, four low-order bits of the head data hd [7:0], i.e., data 0 to data 3, are output to the serial data wires (in the sixth column) d0 to d3 in the tenth to seventh rows, respectively. In a case of the data transfer of the even number of times, four high-order bits of the head data hd [7:4], i.e., data 4 to data 7, are output to the serial data wires (in the sixth column) d0 to d3 in the tenth to the seventh rows in order, respectively.

The EEPROM 23 is a memory for storing types of the LED head, various data to be corrected, and the like. The head control signal hctl [3:0] accesses to the EEPROM 23 from the separating section 24 and the EEPROM 23 then outputs the signal as a signal eep-so to the head signal generator 11 via the cable 3. The driver 22 receives the head data hd [7:0], the data transfer clock hclk, and the head control signal hctl [3:0] to drive the LED array 21. The driver 22 is described later again in association with the LED array 21.

The LED array 21 is such that LED elements corresponding to an arbitrary number of dots are arranged in an array form. The LED head 4 capable of corresponding to the dots for one line is constituted by arranging the plurality of LED arrays 21. It is to be noted that the drivers 22 drive the plurality of corresponding LED arrays 21 respectively and are arranged as many as the plurality of LED arrays 21 in an individually corresponding manner. The plurality of drivers 22 are connected to one another through a cascade connection to shift the received head data sequentially.

In this embodiment, as described above, the transfer controller 6 converts the head data and the predetermined control signal into the multiplex data of the plural bits and further converts the multiplex data into the differential serial data pair, while converting upon reception the clock signal into the differential clock signal pair, thereby transferring the differential serial data pair and the differential clock signal pair to the LED head via the predetermined cable. As a result, the driver array is divided into two arrays, i.e., left and right halves, such that each of the left and right halves receives simultaneously four bits, with the intention to reduce the adverse effects caused by the noise and to speed up the data transfer.

Figure 5:
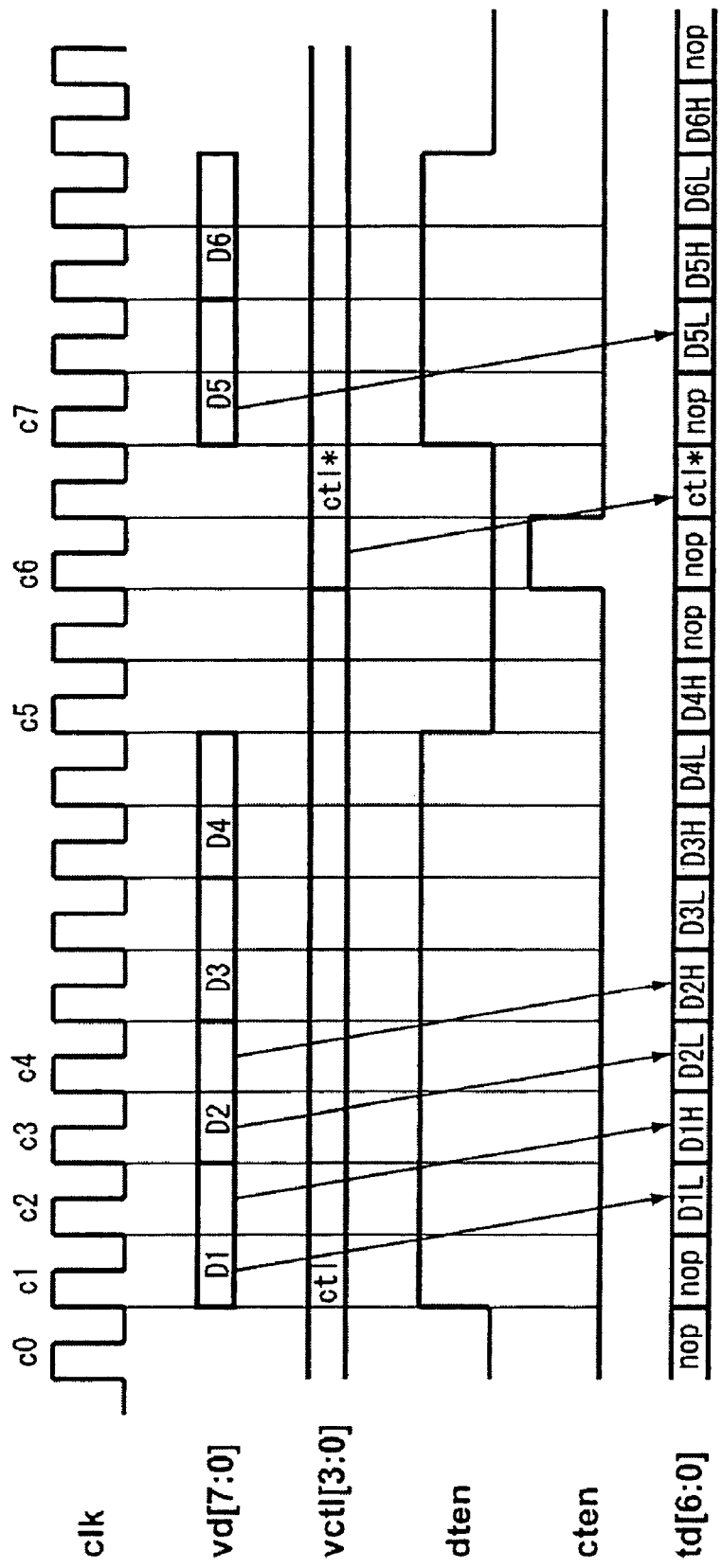
FIG. 5 is a time chart of the multiplex section according to the first embodiment.

Described next is operation for multiplexing and separating the signal according to this embodiment. FIG. 5 is a time chart of the multiplex section according to the first embodiment. In FIG. 5, the first row describes the clock signal clk as a measure of a time lapse of all signals, and an abscissa axis describes such a time lapse as common among all the signals. Subsequently, described in order from top to bottom are the head data vd [7:0], the head control signal vctl [3:0], the data enable signal dten, the control enable signal cten, and the multiplex data td [6:0]. Those data and signals are explained hereinafter in order of the clock described in FIG. 5.

At the time of clock c0, both of the data enable signal dten and the control enable signal cten are still equal to zero. Therefore, those signals are in a status described in the fourth column in FIG. 4, i.e., the status (000). That is, the status is defined as the status holding signals (nop), thereby being held as it is during one clock cycle.

At the time of clock c1, the data enable signal dten is equal to one, such that the data can be transferred. At the same time, the multiplex section 12 receives four low-order bits of the head data vd [7:0]=D1 (e.g., data of the odd number of times). This status is defined as in the second column in FIG. 4, i.e., the status (010). Therefore, the multiplex data td ([6:4]=4$h$, [3:0]=D1L) are to be output after one clock cycle. Herein, four low-order bits D1L, i.e., data 0 to data 3, are output to the serial data wires (in the sixth column in FIG. 4) d0 to d3. It is presumed that symbol — in FIG. 4 indicates zero and that data[6:4] are equal to 4$h$. The same presumption is applied in the following description.

At the time of clock c2, the data enable signal dten remains one while the multiplex section 12 receives four high-order bits of the head data vd [7:0]=D1 (i.e., data of the even number of times). This status is defined as in the second column in FIG. 4, i.e., the status (010). Therefore, the multiplex data td ([6:4]=4$h$, [3:0]=D1H) are to be output after one clock cycle. Herein, four high-order bits D1H, i.e., data 4 to data 7, are output to the serial data wires (in the sixth column in FIG. 4) d0 to d3.

At the time of clock c3, the data enable signal dten remains one while the multiplex section 12 receives the subsequent four low-order bits of the head data vd [7:0]=D2. This status is defined as in the second column in FIG. 4, i.e., the status (010). Therefore, the multiplex data td ([6:4]=4$h$, [3:0]=D2L) are to be output after one clock cycle. Herein, four low-order bits D2L, i.e., data 0 to data 3, are output to the serial data wires (in the sixth column in FIG. 4) d0 to d3.

At the time of clock c4, the data enable signal dten remains one while the multiplex section 12 receives four high-order bits of the head data vd [7:0]=D2. This status is defined as in the second column in FIG. 4, i.e., the status (010). Therefore, the multiplex data td ([6:4]=4$h$, [3:0]=D2H) are to be output after one clock cycle. Herein, four high-order bits D2H, i.e.; data 4 to data 7, are output to the serial data wires (in the sixth column in FIG. 4) d0 to d3.

At the time of clock c5, both of the data enable signal dten and the control enable signal cten become zero. Therefore, the status is defined as in the fourth column in FIG. 4, i.e., the status (000). That is, the status is defined as the status holding signals (nop), thereby being held as it is during one clock cycle.

At the time of clock c6, the data enable signal dten is equal to zero while the control enable signal cten is equal to one. Therefore, the status is defined as in the third column in FIG. 4, i.e., the status (001). At the same time, the head control signal vctl [3:0] changes from ctl to ctl*. That is, the multiplex data td ([6:4]=3$h$, [3:0]=ctl*[3:0]) are to be output after one clock cycle. Herein, the head control signal ctl* [3:0], i.e., ctl 1 to ctl 3, are output to the serial data wires (in the sixth column in FIG. 4) d0 to d3.

At the time of clock c7, the data enable signal dten is equal to one while the control enable signal cten is equal to zero. Therefore, the status is defined as in the second column in FIG. 4, i.e., the status (010). At the same time, the multiplex section 12 receives four low-order bits of the head data vd [7:0]=D5. Therefore, the multiplex data td ([6:4]=4$h$, [3:0]=D5L) are to be output after one clock cycle. Herein, four low-order bits D5L, i.e., data 0 to data 3 are output to the serial data wires (in the sixth column in FIG. 4) d0 to d3.

As described above, the multiplex section 12 (in FIG. 3) receives the clock signal clk, the head data vd [7:0], the head control signal vctl [3:0], the data enable signal dten, and the control enable signal cten to convert these data and signals into the multiplex data td [6:0] in accordance with multiplex rules described with reference to FIG. 4.

The multiplex data td [6:0] multiplexed from the data and signals are input into the serializer 13 in order of (nop), (nop), (D1L), (D1H), (D2L), (D2H). (D3L), (D3H), (D4L), (D4H), (nop), (nop), (ctl*), (nop), (D5L), (D5H), (D6L), (D6H), and (nop), as shown in the last row in FIG. 5, and the serializer 13 converts the multiplex data td [6:0] from parallel to serial and further to the differential serial data pair (data+/−). Subsequently, the differential serial data pair (data+/−) is input into the deserializer 25 shown in FIG. 3 through the cable 3 shown in FIG. 3, thereby being converted into the multiplex (recovery) data rd [6:0] to be output to the separating section 24 shown in FIG. 3. Herein, operation of the separating section 24 in the above described case is explained next.

Figure 6:
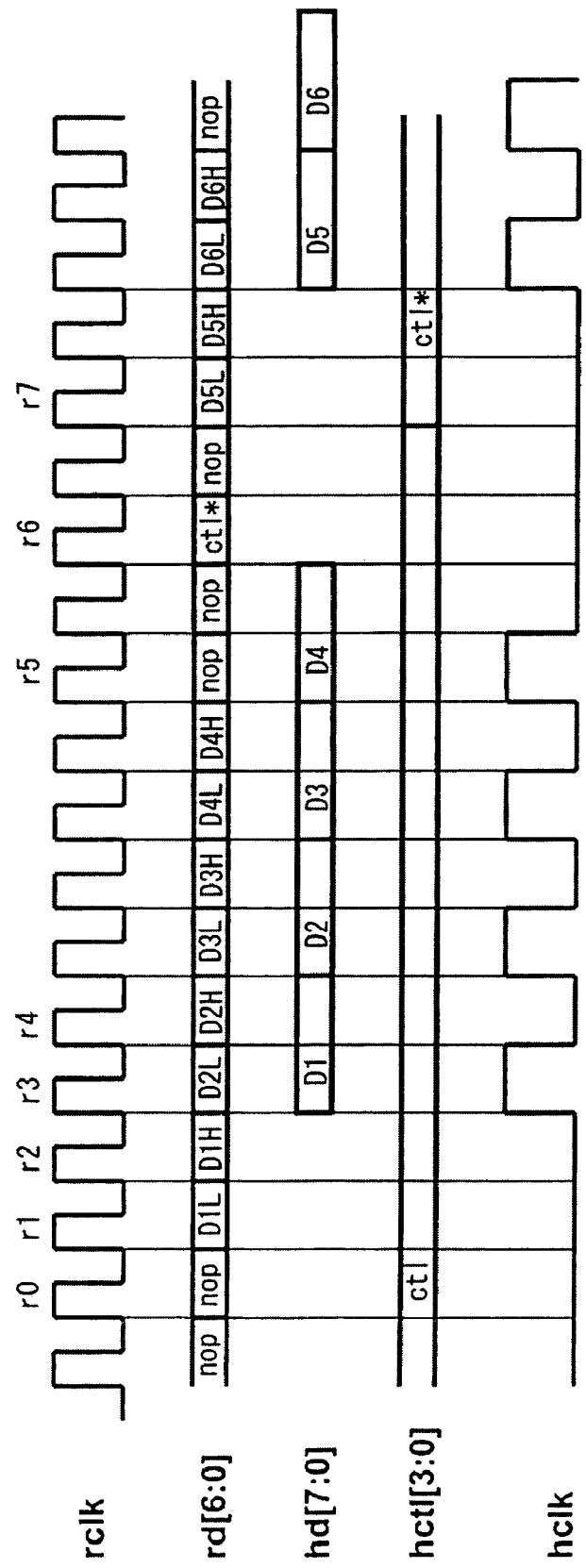
FIG. 6 is a time chart of a separating section according to the first embodiment.

FIG. 6 is a time chart of the separating section according to the first embodiment. The first row in FIG. 6 describes the clock (recover) signal rclk as a measure of time lapse of all signals, and an abscissa axis describes such a time lapse as common among all the signals. Subsequently, described in order from top to bottom are the multiplex (recovery) data rd [6:0], the head data hd [7:0], the head control signal hctl [3:0], and the data transfer clock hclk. Those data and signals are explained in order of the clock shown in FIG. 6.

At the time of clock r0, the separating section 24 shown in FIG. 3 receives the status holding signal nop (10$h$) as the multiplex (recovery) data, such that the status is held as it is during two clock cycles.

At the time of clock r1, the separating section 24 shown in FIG. 3 receives the four low-order bits D1L, i.e., rd ([6:4]=4$h$, [3:0]=D1L) as the multiplex (recovery) data rd [6:0], such that the data are judged as transferred an odd number of times, and thus the data [3:0]=D1L are stored as the four low-order bits in an internal register, not shown, of the separating section 24 shown in FIG. 3 after one click cycle.

At the time of clock r2, the separating section 24 shown in FIG. 3 receives four high-order bits D1H, i.e., rd ([6:4]=4$h$, [3:0]=D1H) as the multiplex (recovery) data rd [6:0], such that the data are judged as transferred an even number of times, and thus the data [3:0]=D1L having been stored in the internal register are defined as four low-order bits whereas the data [3:0]=D1H received herein are defined as four high-order bits. The data D1 are then output as the head data hd [7:0] after one clock cycle (r3). Furthermore, the data transfer clock hclk is to be output at the same time as outputting the head data hd [7:0] (the same applies hereinafter).

At the time of clock r3, the separating section 24 shown in FIG. 3 receives the four low-order bits D2L, i.e., rd ([6:4]=4$h$, [3:0]=D2L) as the multiplex (recovery) data rd [6:0], such that the data are judged as transferred an odd number of times, and thus the data [3:0]=D2L are stored as the four low-order bits in the internal register, not shown, of the separating section 24 shown in FIG. 3 after one click cycle.

At the time of clock r4, the separating section 24 shown in FIG. 3 receives four high-order bits D2H, i.e., rd ([6:4]=4$h$, [3:0]=D2H) as the multiplex (recovery) data rd [6:0], such that the data are judged as transferred an even number of times, and thus the data [3:0]=D2L having been stored in the internal register are defined as four low-order bits whereas the data [3:0]=D2H received herein are defined as four high-order bits. The data D2 are output as the head data hd [7:0] after one clock cycle (r3). At the same time, the data transfer clock hclk is output.

At the time of clock r5, the separating section 24 shown in FIG. 3 receives the status holding signal nop (10h) as the multiplex (recovery) data rd [6:0], such that the status is held as it is during two clock cycles.

At the time of clock r6, the separating section 24 shown in FIG. 3 receives the signal ctl*, i.e., rd ([6:4]=3h, [3:0]=ctl* [3:0]) as the multiplex (recovery) data rd [6:0]. Herein, the signal ctl* [3:0], i.e., ctl1 to ctl3 are output to the serial data wires (in the sixth column) d0 to d3. The signal ctl* [3:0], i.e., ctl1 to ctl3 are output as the head control signal hctl [3:0] after two clock cycles.

At the time of clock r7, the separating section 24 shown in FIG. 3 receives four low-order bits D5L, i.e., rd ([6:4]=4h, [3:0]=D5L) as the multiplex (recovery) data rd [6:0], such that the data are judged as transferred an odd number of times, and thus the data [3:0]=D5L are stored as four low-order bits in the internal register of the separating section 24 shown in FIG. 3 after one clock cycle.

Substantially the same operation is subsequently repeated, and the multiplex (recovery) data rd [6:0] are separated into the head data hd [7:0], the head control signal hctl [3:0], and the data transfer clock hclk.

Described next is operation of the apparatus at times of startup and breaking of the wire. The power-down signal pdwn is set to zero level where a hard reset signal is input to the head signal generator 11 shown in FIG. 3 upon startup of the apparatus. The power-down signal pdwn in zero level is input to the deserializer 25 and the separating section 24 shown in FIG. 3. The deserializer 25 suspends output during the power-down signal pdwn in zero level. During this period, an internal circuit of the separating section 24 is initialized.

During the initialization of the internal circuit, the head control signal vctl [3:0] suspends exposure of the LED array 21 shown in FIG. 3. Any malfunctions of the LED head and the deserializer 25 can be prevented at a time of startup of the apparatus, according to the above described operation. Furthermore, within a predetermined time period subsequent to the setup of the apparatus, it also becomes possible that the head signal generator 11 reads out the data on properties of the LED array 21 having been stored in the EEPROM 23, as a response to the port control signal (in the third column in FIG. 4).

In this bout, any break in the wire can be detected as well. That is, a broken wire status can be detected in a case of reception of an extraordinary value in response to a request for readout of the data on properties. Upon detection of the broken wire, an error message is displayed on a display panel of the image forming apparatus to report an operator. At the same time, it also becomes possible to set the power-down signal pdwn to zero level upon formation of a power-down signal generator, not shown, in the head signal generator 11 in FIG. 3 so as to suspend exposure of the LED array 21 in FIG. 3. In the meanwhile, the resistor R inside the LED head 4 sets the power-down signal pdwn to zero level where the wire of a power-down signal pdwn system itself is broken, thereby being able to prevent a malfunction.

As described above, the multiplex section 12 in FIG. 3 receives in parallel the head data vd [7:0], the head control signal vctl [3:0], the data enable signal dten, and the control enable signal cten and then converts those data and signals into the multiplex data of seven bits, and further converts the data into the differential serial data pair (data+/−) while receiving the clock signal to convert this signal into the differential clock signal pair (clk+/−). Thus, it is not required any more to transfer in parallel the parallel head data, the clock signal, and the control signal via respectively different wires, whereby such cases can be suppressed that loud digital noise occurs to cause malfunction of peripheral circuits or to become such EMI noise (radiated noise) as having adverse effects on the exterior apparatus. As a result, the transfer of the head data can be easily speeded up, thereby producing effects such as speedup of the data transfer, which are more than covering decrease in data transfer efficiency due to serial transfer of the parallel head data.

Furthermore, such an effect can be produced that unstable operation can be eliminated by transferring the power-down signal pdwn from the head signal generator 11 to the deserializer 25 and the separating section 24 in FIG. 3 at the time of startup of the apparatus. Yet more, it also becomes possible that the head signal generator 11 reads out the data on properties of the LED array 21 having been stored in the EEPROM 23, as a response to the port control signal (in the third column in FIG. 4). In this bout, such an effect can be produced that the broken wire can be detected.

Second Embodiment

In this second embodiment, the differential clock signal is not transferred via the independent twisted-pair cables but transferred upon further multiplexed into the differential serial data pair and the clock signal is regenerated from the transferred differential serial data pair (data+/−) inside the LED head. Therefore, the number of bits of the multiplex data td output from the multiplex section is herein increased to 10 bits.

Figure 7:
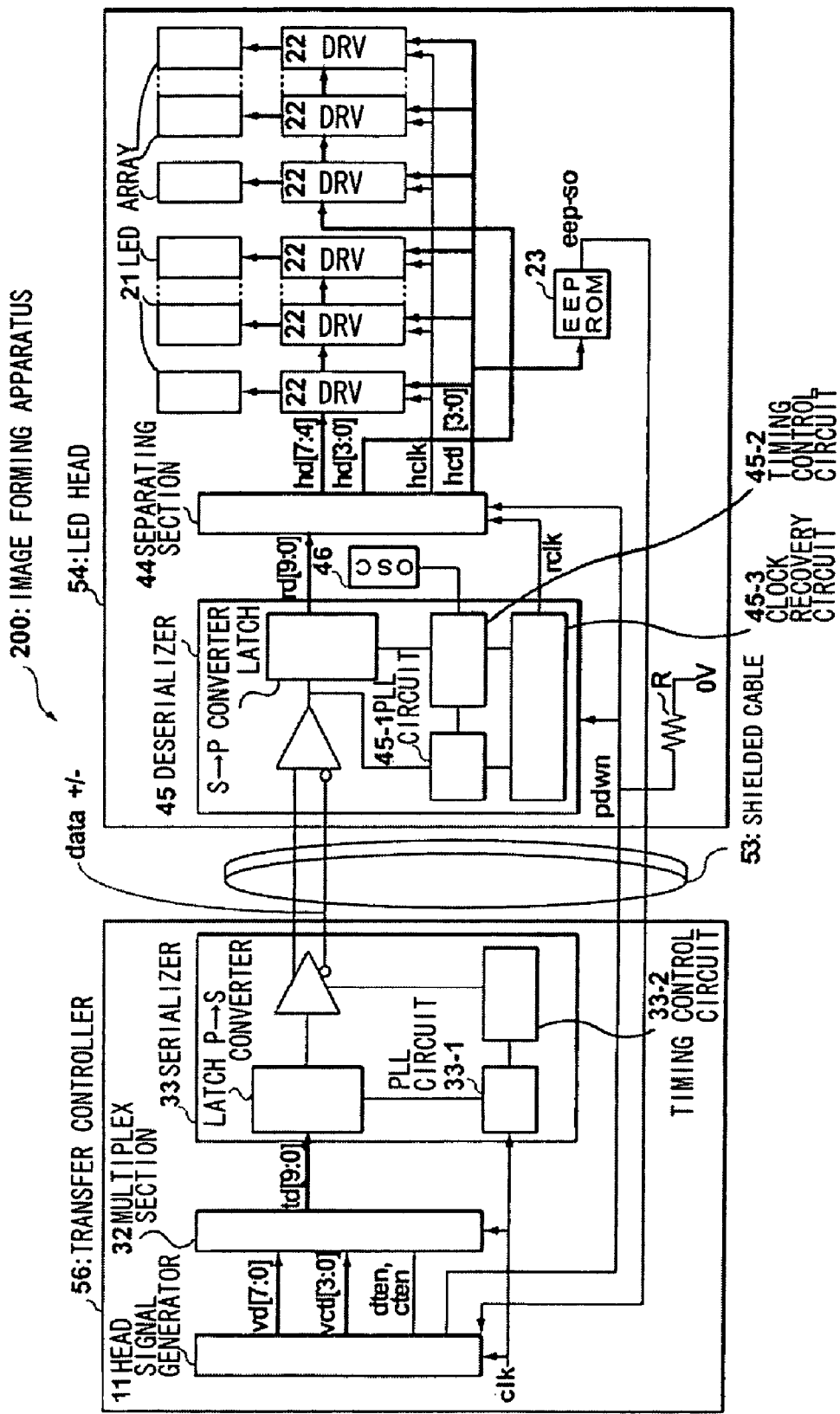
FIG. 7 is a schematic view showing an essential function of an image forming apparatus according to a second embodiment.

An entire structure of the image forming apparatus according to the second embodiment is substantially the same as that of the image forming apparatus 100 according to the first embodiment, such that those duplicated descriptions are omitted for the sake of simplicity, whereby details of the transfer controller and the LED head used in the image forming apparatus according to the second embodiment are described mainly with respect to those functions. FIG. 7 is a schematic view illustrating an essential function of an image forming apparatus according to the second embodiment. FIG. 7 is a functional block a function for arbitrary one color among the colors of black, yellow, magenta, and cyan according to the four-color system. In the image forming apparatus 200 according to the second embodiment, the differential serial data pair (data+/−) are transferred from a transfer controller 56 to an LED head 54 via a cable 53. Furthermore, the signal pdwn is transferred from the transfer controller 56 to the LED head 54 via the cable 53, whereas the signal eep-so is transferred from the LED head 54 to the transfer controller 56 via the cable 53. Only elements different from those in the first embodiment are described. The elements substantially the same as those in the first embodiment are assigned with the same reference numbers such that those duplicated description are omitted.

The transfer controller 56 has inside thereof the head signal generator 11, a multiplex section 32, and a serializer 33.

The multiplex section 32 receives in parallel the head data vd [7:0], the head control signal vctl [3:0], the data enable signal dten, and the control enable signal cten to produce an output upon converting those data and signals into the multiplex data td [9:0] of ten bits. The multiplex section executes this multiplexing process in accordance with predetermined rules previously set up. One example of the rule is described hereinafter.

FIG. 8 is an illustration of multiplex rules on the multiplex section according to the second embodiment. In FIG. 8, the first row describes the input signal and varieties of the packet generated upon the multiplexing process, or namely "contents of a signal". That is, the first column describes the status input signal, the second column describes the data transfer signal, the third column describes the port control signal, the fourth column describes the status holding (nop, i.e., no operation instruction) signal, the fifth column describes the soft reset signal, and the sixth column describes the serial data wire. A content of the signal to be multiplexed is set up according to a combination of input signals, i.e., the soft reset signal, the data enable signal dten, and the control enable signal cten respectively described in the first to third rows. For example, in a case of the soft reset signal in an off-status (0), the data enable signal dten equal to one, and the control enable signal cten equal to zero, the input signal is defined as zero one zero, whereby the multiplex data td [9:0] to be output indicates the data transfer signal in the second column.

In a case of data transfer of an odd number of times, four low-order bits, i.e., data 1 to data 3, of the head data vd [7:0] are output to the serial data wires (in the sixth column) d0 to d3 (in the seventh row), respectively. In a case of data transfer of an even number of times at that time, four high-order bits, i.e., data 4 to data 7, of the head data vd [7:0] are output sequentially to the serial data wires (in the six column) d0 to d3, respectively. Herein, the odd number of times means the odd number of times when the image data are transferred, whereas the even number of times means the even umber of times when the image data are transferred. One line of the image data are transferred upon divided into the data of the odd number of times and the data of the even number of times but restructured inside the LED head 54, thereby being exposed as one main scanline.

As for FIG. 7 again, the serializer 33 receives in parallel the multiplex data td [9:0] from the multiplex section 32 and converts the data from parallel to serial, i.e., to the differential serial data pair (data+/−) to output the differential serial data pair (data+/−). Furthermore, the serializer 33 receives and multiplies the clock signal clk to a predetermined frequency using a PLL circuit 33-1 and then adjusts a timing of the differential serial data pair (data+/−) using a timing control circuit 33-2 to bring the differential serial data pair (data+/−) into sync with the clock signal multiplied to the predetermined frequency.

Herein, the differential serial data pair (data+/−) indicates such a signal status that both of the serial data data+ and data− are output to two signal wires at the same timing, in which the multiplex data received from the multiplex section 32 is converted into the serial data data+ and the serial data data− are obtained by generating a signal having an opposite polarity to the serial data data+.

Figure 9:
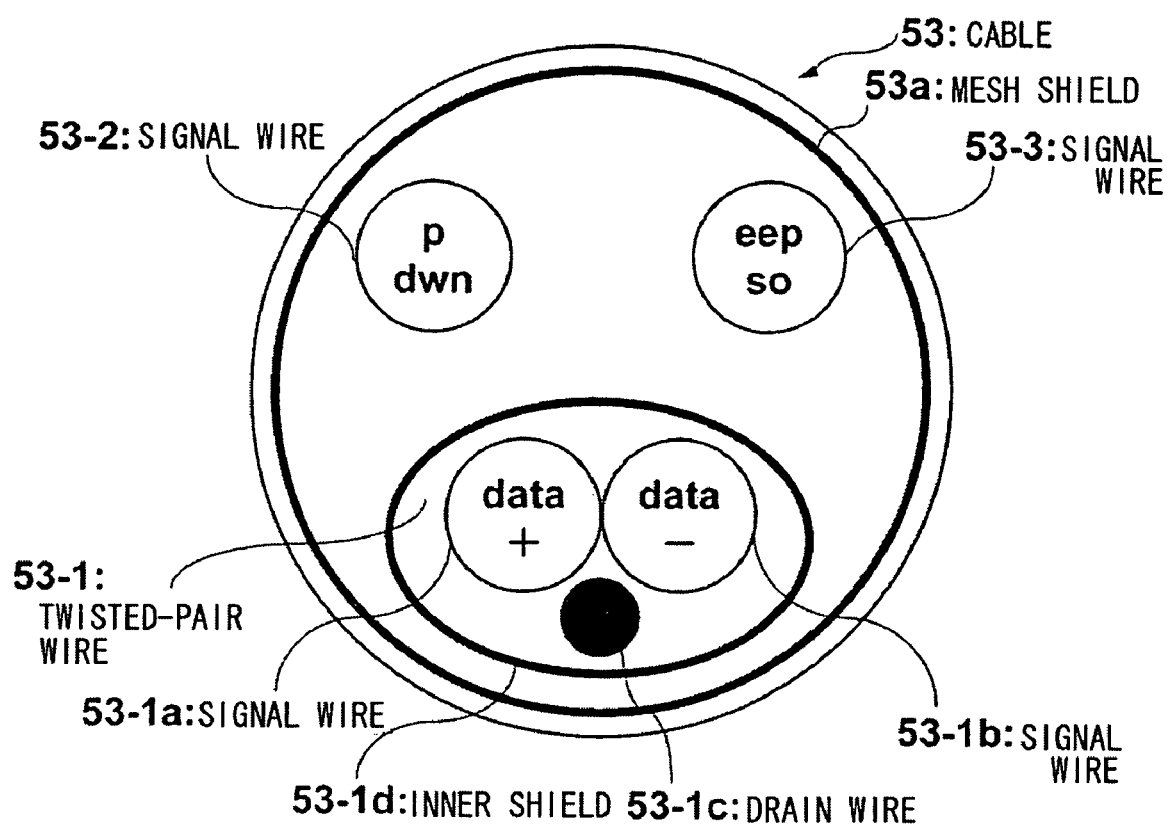
FIG. 9 is a cross-sectional view showing a cable according to the second embodiment.

The cable 53 are signal cables for connecting the transfer controller 56 to four LED heads 54. An inner structure of this cable is described herein. As shown in FIG. 9, the cable 53 used in the second embodiment contains inside therein a twisted-pair wire 53-1 and signal wires 53-2, 53-3, in which an outer circumference of the cable 53 is shielded by a mesh shield 53a. The twisted-pair wire 53-1 is composed of signal wires 53-1a, 53-1b, a drain wire 53-1c, and an inner shield 53-1d for shielding both of the signal wires 53-1a, 53-1b. The signal wire 53-1a transfers the differential serial data data+ while the signal wire 53-1b transfers the differential serial data data−, and the drain wire 53-1c has both ends thereof connected to earth wires of the transfer controller 56 and the LED head 54 shown in FIG. 7, respectively, for the sake of eliminating noise components. The signal wire 53-3 transfers the power-down signal pdwn described later whereas the signal wire 53-4 transfers the signal eep-so described later.

As for FIG. 7 again, the LED head 54 receives the differential serial data pair (data+/−) from the serializer 33 via the cable 53 while inwardly regenerating the clock (recovery) signal rclk in sync with the differential serial data pair (data+/−) to expose the desired images onto a photosensitive drum. The LED head 54 has inside thereof a deserializer 45, a separating section 44, the EEPROM 23, the driver 22, the LED array 21.

The deserializer 45 receives the differential serial data pair (data+/−) from a serializer 33 via the cable 53 and inversely converts the data pair into the multiplex (recovery) data rd [9:0] to output the multiplex data. Furthermore, the deserializer 45 receives an oscillation output signal from an oscillator OSC46, multiplies the signal to a predetermined frequency using a PLL circuit 45-1, adjusts a timing of the oscillation output signal using the a timing control circuit 45-3, bringing the signal in sync with the differential serial data pair (data+/−), regenerates the clock (recovery) data rclk brought in sync with the multiplex (recovery) data rd [9:0] using a clock recovery circuit 45-3, and outputs the clock (recovery) data rclk.

The separating section 44 receives the multiplex (recovery) data rd [9:0] of ten bits from the deserializer 45 and separates the above data into four low-order bits of the head data hd [3:0], four high-order bits of the head data hd [7:4], and the control signal [3:0] to output those data and signal. The separating section 44 also receives the clock (recovery) signal rclk from the deserializer 45 to output the data transfer clock hclk. Furthermore, the separating section 44 receives the power-down signal pdwn from the head signal generator 11 via the cable 53. This signal is pulled down at an input end of the LED head 54.

Herein, the above separation of the multiplex (recovery) data of ten bits into four low-order bits of the head data hd [3:0], four high-order bits of the head data hd [7:4], and the control signal [3:0] is executed in accordance with the rules described in FIG. 8, in reverse order from operation of the multiplex section 32. In substantially the same manner as described in description for the multiplex section 32, for example, in a case of the soft reset signal in an off-status (0), the data enable signal dten equal to one and the control enable signal cten equal to zero, the input signal is defined as zero one zero, whereby the multiplex (recovery) data rd [9:0] to be received indicates the data transfer signal in the second column.

In a case of the data transfer of the odd number of times, four low-order bits of the head data hd [3:0] are output to the serial data wires (in the sixth column) d0 to d3, respectively. In a case of the data transfer of the even number of times, four high-order bits of the head data hd [7:4] are sequentially output to the serial data wires (in the sixth column) d0 to d3 in order, respectively. It is to be noted that operational time charts of the multiplex section 32 and the separating section 44 are exactly the same as those of the first embodiment, such that those duplicated descriptions are omitted for the sake of simplicity.

As described above, such noises as coinciding at the same timing can be remarkably decreased according to this embodiment since the image forming apparatus 200 in this embodiment eliminates the operation for transferring the clock signal from the transfer controller 56 to the LED head 54 so the clock signal as to be regenerated from the transferred differential serial data pair (data+/−) inside the LED head 54. As a result, traffic of the head data can be remarkably increased, thereby producing such effects as further improvement in speed and resolution of the image forming apparatus.

Third Embodiment

In the above described second embodiment, the multiplex (recovery) data output from the separating section are composed of ten bits but are transferred four bits by four bits during one clock cycle, thereby resulting in efficiency reduction. In this third embodiment, the multiplex (recovery) data are to be transferred eight bits by eight bits during one clock cycle upon making a modification to the multiplex rules on the multiplex section.

An entire structure of the image forming apparatus according to the third embodiment is substantially the same as that of the image forming apparatus 100 according to the first embodiment, such that those duplicated descriptions are omitted for the sake of simplicity, whereby details of the transfer controller and the LED head used in the image forming apparatus according to the third embodiment are described mainly with respect to those functions.

Figure 10:
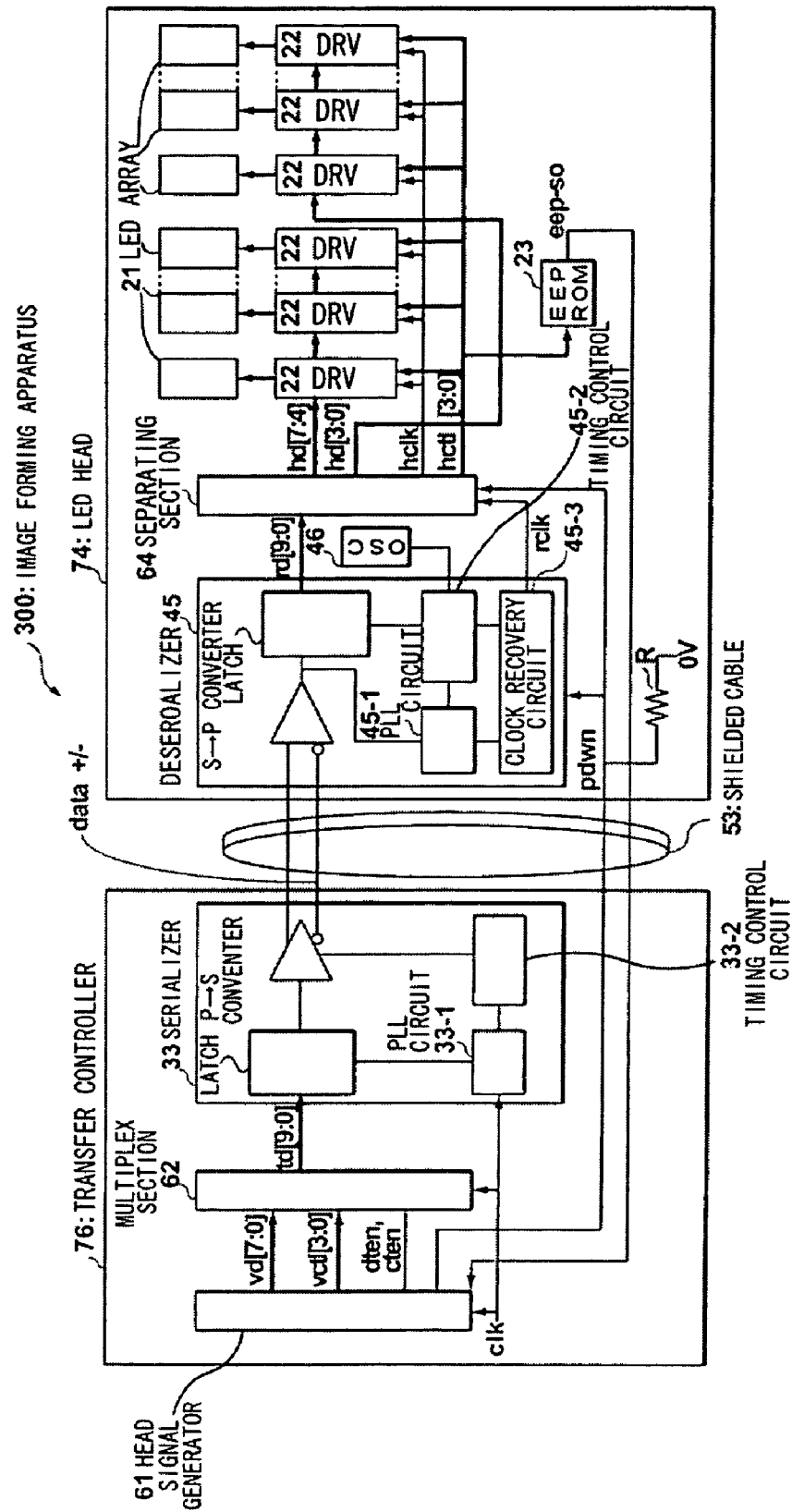
FIG. 10 is a schematic view showing an essential function of an image forming apparatus according to a third embodiment.

FIG. 10 is a schematic view illustrating an essential function of the image forming apparatus according to the third embodiment. FIG. 10 is a functional block a function for arbitrary one color among black, yellow, magenta, and cyan colors according to four-color system. As shown in FIG. 10, in an image forming apparatus 300 according to the third embodiment, the differential serial data pair (data+/−) are transferred from a transfer controller 76 to an LED head 74 via the cable 53. Furthermore, the power-down signal pdwn is transferred from the transfer controller 76 to the LED head 74 via the cable 53, and the signal eep-so is transferred from the LED head 74 to the transfer controller 76 via the cable 53. Only elements different from those of the second embodiment are described hereinafter. The elements substantially the same as those of the first and second embodiments are assigned with the same reference numbers such that those duplicated description are omitted.

The transfer controller 76 has inside thereof a head signal generator 61, a multiplex section 62, and the serializer 33. The head signal generator 61 is composed of the buffer for storing as many as the plurality of lines the image data received from the image controller 1, the pointer for writing in'the buffer, the pointer for reading out of the buffer, and the state machine for controlling those pointers and for generating the head control signal for each line.

The head signal generator 61 furthermore generates the head data vd [7:0] of eight bits and the head control signal vctl [3:0] of four bits from the image data, and further generates the data enable signal dten for indicating a status of the state machine and the control enable signal cten. Herein, the data enable signal dten is such a signal that is equal to one while the data transferred to the LED head 74 are effective, whereas the control enable signal cten is such a signal that is equal to one only at timing when the head control signal vctl [3:0] changes. Furthermore, the head data vd [7:0] of eight bits are transferred four bits by for bits in two clock cycles, in the above described first and second embodiments but the head data vd [7:0] of eight bits are transferred during one clock cycle at once in this third embodiment.

The multiplex section 62 receives in parallel the head data vd [7:0], the head control signal vctl [3:0], the data enable signal dten, and the control enable signal cten and converts those data and signals into the multiplex data td [9:0] of ten bits to output the multiplex data. The multiplex section 62 executes this multiplexing process in accordance with predetermined rules previously set up. One example of the rule is described hereinafter.

Figure 11:
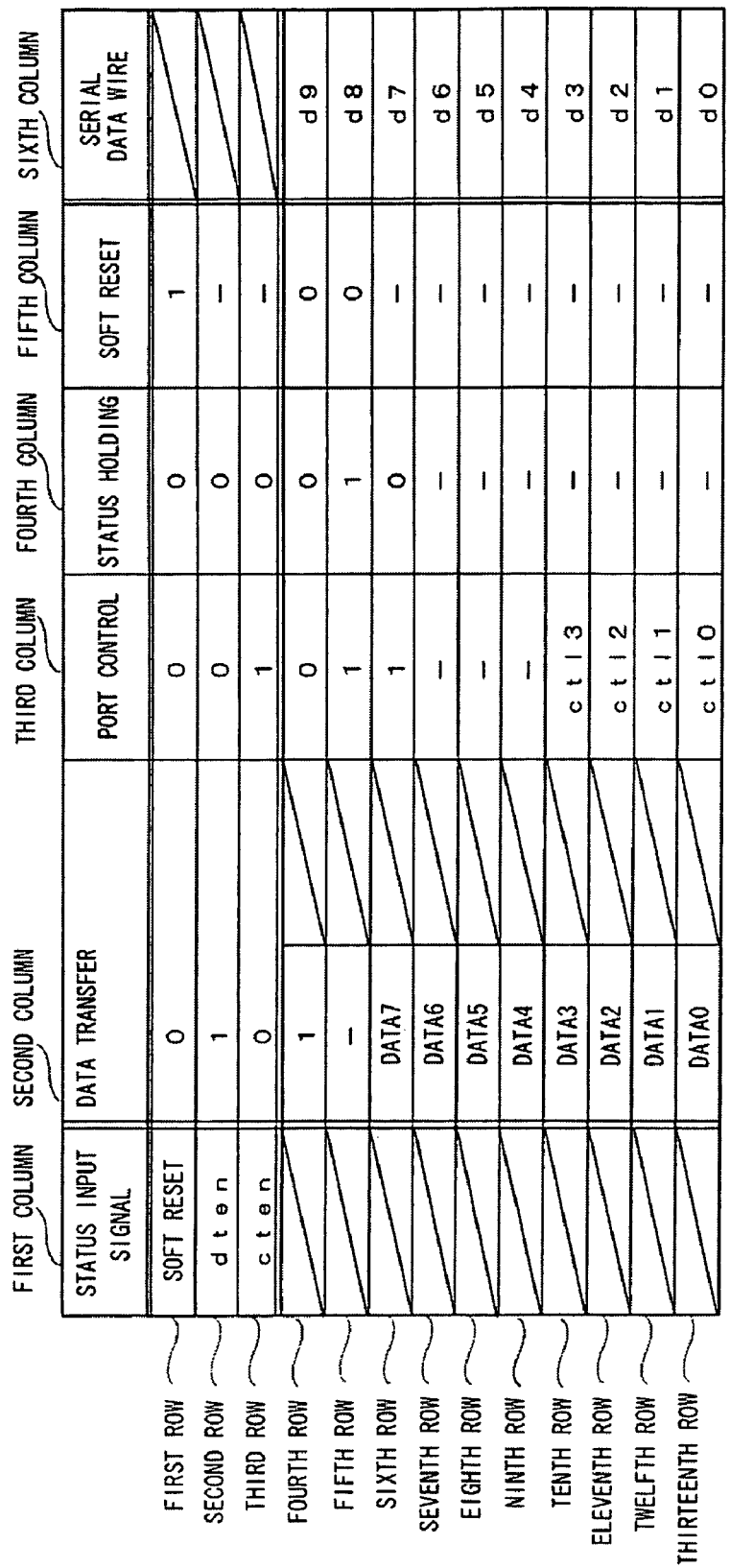
FIG. 11 is an illustration of multiplex rules on a multiplex section according to the third embodiment.

FIG. 11 is an illustration of the multiplex rules on a multiplex section according to the third embodiment. In FIG. 11, the first row describes the input signal and varieties of the packet generated upon the multiplexing process, or namely "contents of a signal". That is, the first column describes the status input signal, the second column describes the data transfer signal, the third column describes the port control signal, the fourth column describes the status holding (nop, i.e., no operation instruction) signal, the fifth column describes the soft reset signal, and the sixth column describes the serial data wire. A content of the signal to be multiplexed is set up according to a combination of input signals, i.e., the soft reset signal, the data enable signal dten, and the control enable signal cten respectively described in the first to third rows. For example, in a case of the soft reset signal in an off-status (0), the data enable signal dten equal to one, and the control enable signal cten equal to zero, the input signal is defined as zero one zero, whereby the multiplex data td [9:0] to be output indicates the data transfer signal in the second column. The image data in this bout are output regardless of the odd number of times and the even number of times, or namely the head data hd [7:0] are output to the serial data wires d0 to d7 in the sixth column at once.

As for FIG. 10 again, the LED head 74 receives the differential serial data pair (data+/−) from the serializer 33 via the cable 53 while inwardly regenerating the clock (recovery) signal rclk in sync with the differential serial data pair (data+/−) to expose the desired images onto a photosensitive drum. The LED head 74 has inside thereof the deserializer 45, a separating section 64, the EEPROM 23, the driver 22, the LED array 21.

The separating section 64 receives the multiplex (recovery) data rd [9:0] of ten bits from the deserializer 45 and then separates the data into the head data hd [7:0] of eight bits and the control signal [3:0] to produce an output. The separating section 64 furthermore receives the clock (recovery) signal rclk from the deserializer 45 to putput the data transfer clock hclk. Yet further, the separating section 64 receives the power-down signal pdwn from the head signal generator 11 via the cable 53. This signal is pulled down at an input end of the LED head 54.

Herein, the separation of the multiplex (recovery) data rd [9:0] of ten bits into the head data hd [7:0] of eight bits and the control signal [3:0] is executed in accordance with the rules described in FIG. 11, in reverse order from operation of the multiplex section 62. In substantially the same manner as described in description for the multiplex section 62, for example, in a case of the soft reset signal in an off-status (0), the data enable signal dten equal to one and the control enable signal cten equal to zero, the input signal is defined as zero one zero, whereby the multiplex (recovery) data rd [9:0] to be received indicates the data transfer signal in the second column. The head data hd [7:0] are output to the serial data wires d0 to d7 regardless of the odd number of times and the even number of times in this bout.

Figure 12:
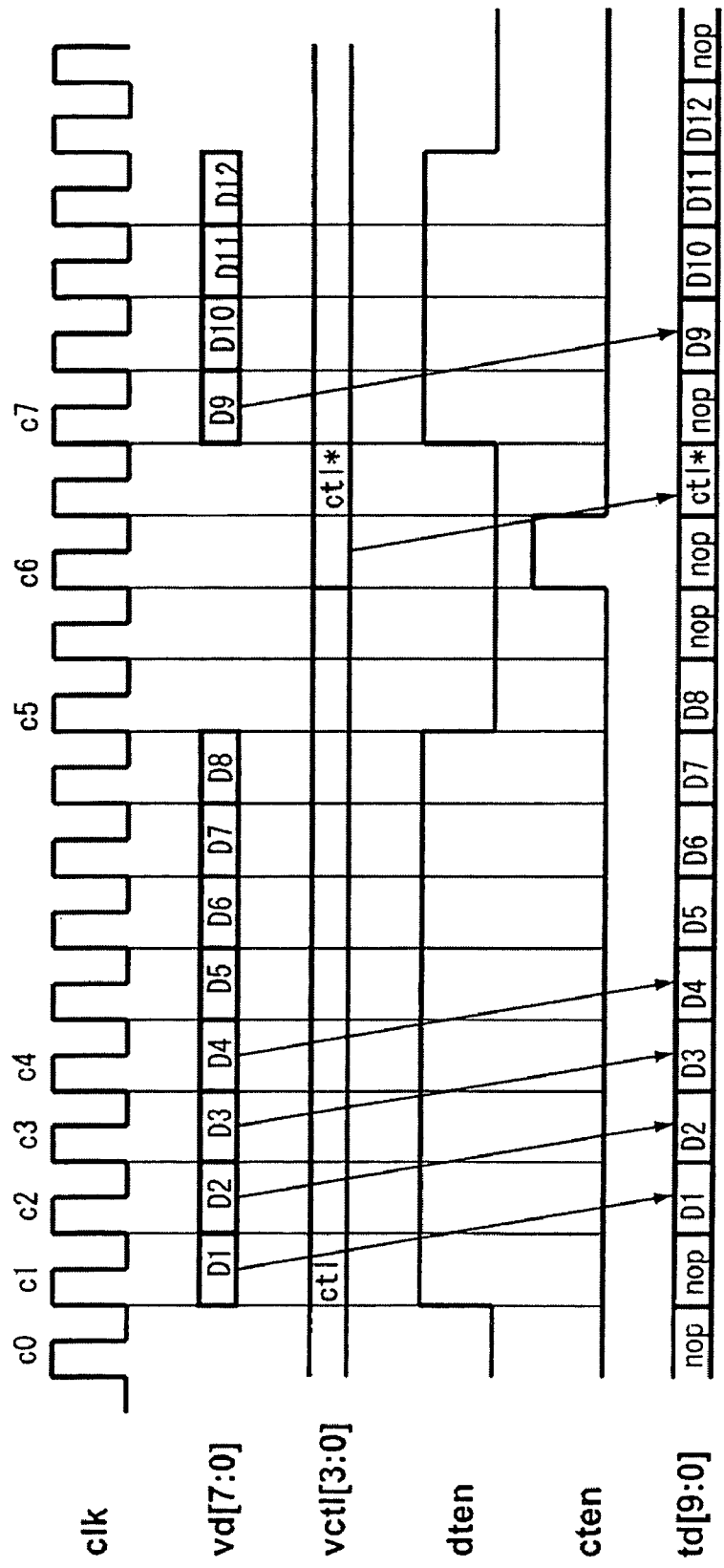
FIG. 12 is a time chart of the multiplex section according to the third embodiment.

Described next are a signal multiplexing operation and a separating operation according to this third embodiment. FIG. 12 is a time chart of the multiplex section according to the third embodiment. The first row describes the clock signal clk as a measure of a time lapse of all signals, and an abscissa axis describes such a time lapse as common among all of the signals. Subsequently, described in order from top to bottom are the head data vd [7:0], the head control signal vctl [3:0], the data enable signal dten, the control enable signal cten, and the multiplex data td [9:0]. Those data and signals are explained hereinafter in order of the clock described in FIG. 12.

At the time of clock c0, both of the data enable signal dten and the control enable signal cten are still equal to zero. Therefore, those signals are in a status described in the fourth column in FIG. 11, i.e., the status (000). That is, the status is defined as the status holding signals (nop), thereby being held as it is during one clock cycle.

At the time of clock c1, the data enable signal dten is equal to one, such that the data can be transferred. At the same time, the multiplex section 62 receives all bits of the head data vd [7:0]=D1. This status is defined as in the second column in FIG. 11, i.e., the status (010). Therefore, the multiplex data td ([9:8]=2h, [7:0]=D1) are to be output after one clock cycle. Herein, all bits of D1, i.e., data 0 to data 7, are output to the serial data wires (in the sixth column in FIG. 11) d0 to d7.

At the time of clock c2, the data enable signal dten remains one while the multiplex section 62 receives all bits of the head data vd [7:0]=D2. This status is defined as in the second column in FIG. 11, i.e., the status (010). Therefore, the multiplex data td ([9:8]=2h, [7:0]=D2) are to be output after one clock cycle. Herein, all bits of D2, i.e., data 0 to data 7, are output to the serial data wires (in the sixth column in FIG. 11) d0 to d7.

At the time of clock c3, the data enable signal dten remains one while the multiplex section 62 receives all bits of the head data vd [7:0]=D3. This status is defined as in the second column in FIG. 4, i.e., the status (010). Therefore, the multiplex data td ([9:8]=2h, [7:0]=D3) are to be output after one clock cycle. Herein, all bits of D3, i.e., data 0 to data 7, are output to the serial data wires (in the sixth column in FIG. 4) d0 to d7.

At the time of clock c4, the data enable signal dten remains one while the multiplex section 62 receives all bits of the head data vd [7:0]=D4. This status is defined as in the second column in FIG. 11, i.e., the status (010). Therefore, the multiplex data td ([9:8]=2h, [7:0]=D4) are to be output after one clock cycle. Herein, all bits of D4, i.e., data 0 to data 7, are output to the serial data wires (in the sixth column in FIG. 11) d0 to d7.

At the time of clock c5, both of the data enable signal dten and the control enable signal cten become zero. Therefore, the status is defined as in the fourth column in FIG. 11, i.e., the status (000). That is, the status is defined as the status holding signals (nop), thereby being held as it is during one clock cycle.

At the time of clock c6, the data enable signal dten is equal to zero while the control enable signal cten is equal to one. Therefore, the status is defined as in the third column in FIG. 11, i.e., the status (001). At the same time, the head control signal vctl [3:0] changes from ctl to ctl*. That is, the multiplex data td ([9:4]=18h, [3:0]=ctl*[3:0]) are to be output after one clock cycle. Herein, the head control signal ctl* [3:0], i.e., ctl 1 to ctl 3, are output to the serial data wires (in the sixth column in FIG. 11) d0 to d3.

At the time of clock c7, the data enable signal dten is equal to one while the control enable signal cten is equal to zero. Therefore, the status is defined as in the third column in FIG. 11, i.e., the status (001). At the same time, the multiplex section 62 receives all bits of the head data vd [7:0]=D9. This status is defined as in the second column in FIG. 11, i.e., the status (010). Therefore, the multiplex data td ([9:8]=2h, [7:0]=D9) are to be output after one clock cycle. Herein, all bits of D9, i.e., data 0 to data 7 are output to the serial data wires (in the sixth column in FIG. 11) d0 to d7.

As described above, the multiplex section 62 (in FIG. 10) receives the clock signal clk, the head data vd [7:0], the head control signal vctl [3:0], the data enable signal dten, and the control enable signal cten to convert these data and signals into the multiplex data td [9:0] in accordance with multiplex rules described with reference to FIG. 11.

The multiplex data td [9:0] multiplexed from the data and signals are input into the serializer 33 in FIG. 3 in order of (nop), (nop), (D1), (D2), (D3), (D4), (D5), (D6), (D7), (D8), (nop), (nop), (ctl*), (nop), (D9), (D10), (D11), (D12), and (nop), as shown in the last row in FIG. 12, and the serializer 33 converts the multiplex data td [9:0] from parallel to serial and further to the differential serial data pair (data+/−). Subsequently, the differential serial data pair (data+/−) is input into the deserializer 45 via the cable 53 shown in FIG. 10, thereby being converted into the multiplex (recovery) data rd [9:0] to be output to the separating section 64 shown in FIG. 10. Herein, operation of the separating section 64 in the above described case is explained next.

Figure 13:
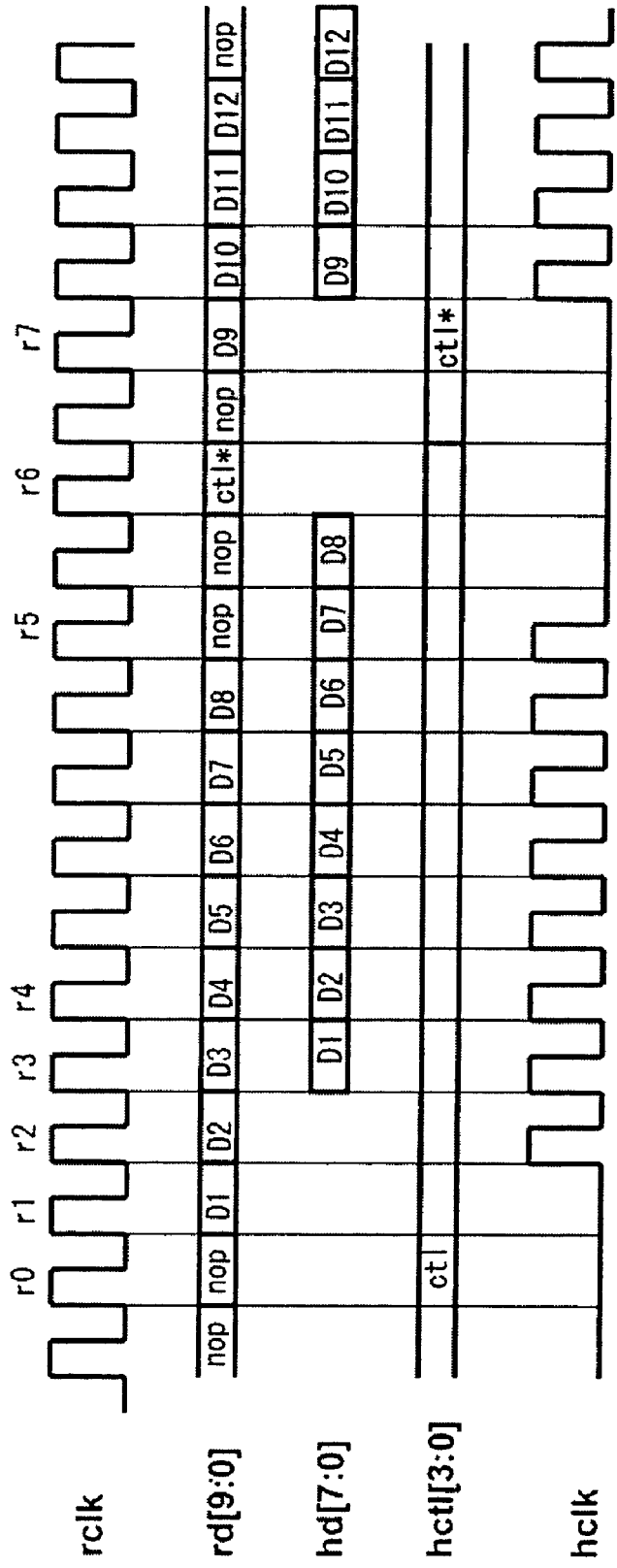
FIG. 13 is a time chart of a separating section according to the third embodiment.

FIG. 13 is a time chart of the separating section according to the third embodiment. The first row in FIG. 13 describes the clock (recover) signal rclk as a measure of time lapse of all signals, and an abscissa axis describes such a time lapse as common among all of the signals. Subsequently, described in order from top to bottom are the multiplex (recovery) data rd [9:0], the head data hd [7:0], the head control signal hctl [3:0], and the data transfer clock hclk. Those data and signals are explained in order of the clock shown in FIG. 13.

At the time of clock r0, the separating section 64 shown in FIG. 10 receives the status holding signal nop (10h) as the multiplex (recovery) data rd [9:0], so that the status is held as it is during one clock cycle.

At the time of clock r1, the separating section 64 receives D1, i.e., rd ([9:8]=2h, [7:0]=D1) as the multiplex (recovery) data rd [9:0], thereby outputting D1 as the head data hd [7:0] after one clock cycle. Furthermore, the data transfer clock hclk is to be output at the same time as outputting the head data hd [7:0] (the same applies hereinafter).

At the time of clock r2, the separating section 64 in FIG. 10 receives D2, i.e., rd ([9:8]=2h, [7:0]=D2) as the multiplex (recovery) data rd [9:0], thereby outputting D2 as the head data hd [7:0] after one clock.

At the time of clock r3, the separating section 64 in FIG. 10 receives D3, i.e., rd ([9:8]=2h, [7:0]=D3) as the multiplex data rd [9:0], thereby outputting D3 as the head data hd [7:0] after one clock.

At the time of clock r4, the separating section 64 in FIG. 10 receives D4, i.e., rd ([9:8]=2h, [7:0]=D4) as the multiplex data rd [9:0], thereby outputting D4 as the head data hd [7:0] after one clock cycle.

At the time of clock r5, the separating section 64 in FIG. 10 receives the status holding signal nop (100h) as the multiplex (recovery) data rd [9:0], such that the status is held as it is during one clock cycle.

At the time of clock r6, the separating section 64 in FIG. 10 receives the signal ctl*, i.e., rd ([9:4]=18h, [3:0]=ctl*[3:0]) as the multiplex (recovery) data rd [9:0]. Herein, the signal ctl* [3:0], i.e., ctl1 to ctl3 are output to the serial data wires (in the sixth column) d0 to d3. The signal ctl* [3:0], i.e., ctl1 to ctl3 are output as the head control signal hctl [3:0].

At the time of clock r7, the separating section 64 in FIG. 10 receives D9, i.e., rd ([9:8]=2h, [7:0]=D9) as the multiplex (recovery) data rd [9:0], thereby outputting D9 as the head data hd [7:0] after one clock cycle.

Substantially the same operation is subsequently repeated, and the multiplex (recovery) data rd [9:0] are separated into the head data hd [7:0], the head control signal hctl [3:0], and the data transfer clock hclk.

As described above, in addition to the effects of the second embodiment, the data transfer efficiency can be remarkably improved according to this embodiment since the multiplex (recovery) data are transferred eight bits by eight bits upon making a modification to the multiplex rules on the multiplex section. As a result, such effects can be produced that speed and resolution of the image forming apparatus can be improved.

It is to be noted that bit width of the multiplex data output from the multiplex section is set to seven bits in the first embodiment while being set to ten bits in the second and third embodiments but this invention is not limited to those embodiments. That is, the bit width can be arbitrarily changed upon changing multiplication value N for the PLL circuits built in the serializer and the deserializer. In this case, the data transfer efficiency can be remarkably improved upon modifying the multiplex rules on the multiplex section in accordance with the change of the multiplication value N. Furthermore, described in common among all the embodiments is such a case that the driver array of the LED head is divided into two, but this invention is not limited to those embodiments. Such a case, for example, is applicable that the driver array is divided into four and the separating section outputs 16 bit width signal to remarkably improve the data transfer efficiency. Furthermore, the cables shown in FIG. 2 and FIG. 9 are an example of cables used for this invention, which is not limited to those cables. That is, any types of shielded cables for high speed data transfer are applicable. Yet further, described in each of the embodiments is a case where the exposure head is composed of arrayed LED elements but this case is just an example, and this invention is not limited this example. That is, such an element as EL (electroluminescence) element or the like may be applicable as a light emitting element.

The present invention described above is applicable not only to a printer but also to all types of the image forming apparatus such as a photocopier, a facsimile machine, a multi-function printer such as an apparatus having combined functions of a scanning function, a copying function, and the like other than a printing function, and so on.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An image forming apparatus comprising:
   an LED head including a plurality of LED elements arranged in an array form and selectively exposed to form an image; and
   a transfer controller connected via a predetermined cable to said LED head, for transferring image data to said LED head,
   wherein said transfer controller includes:
   a multiplex section configured to receive in parallel said image data and a control signal for driving said LED elements and to output bit parallel data composed of a plurality of bits upon multiplexing said image data and said control signal; and
   a converter configured to: (1) receive said bit parallel data composed of said plurality of bits and to output said bit parallel data upon converting to differential serial data pair and (2) receive a clock signal and to output said clock signal upon converting to a differential clock signal pair; and
   wherein said LED head includes:
   a reverse converter configured to: (1) receive said differential serial data pair via said predetermined cable and to output said differential serial data pair upon inversely converting to said bit parallel data composed of a plurality of bits, and (2) receive said differential clock signal pair and to output said differential clock signal pair upon inversely converting to said clock signal;
   a separating section configured to separate said bit parallel data composed of said plurality of bits into said image data and said control signal and to output said image data and said control signal, and
   a driver for driving said plurality of LED elements arranged in said array form upon reception of said image data and said control signal, wherein
   the control signal comprises a first control signal and a second control signal, and wherein
   the bit parallel data are formed of low-order image data and the second control signal, high-order image data and the second control signal, the first control signal and the second control signal, or the second control signal.

2. The image forming apparatus according to claim 1, wherein said transfer controller further comprises a power-down signal generator for generating and supplying to said reverse converter and said separating section a power-down signal for suspending operation of said reverse converter and said separating section, and wherein said power-down signal generator supplies said power-down signal to said reverse converter and said separating section for a predetermined period after startup of said transfer controller.

3. The image forming apparatus according to claim 1, wherein said LED head further comprises a nonvolatile memory for memorizing predetermined data, and wherein said transfer controller reads out said predetermined data using said control signal to detect an extraordinary connection of said predetermined cable.

4. The image forming apparatus according to claim 3, wherein said transfer controller further comprises a power-down signal generator for generating and supplying to said reverse converter and said separating section a power-down signal for suspending operation of said reverse converter and said separating section, and wherein said power-down signal generator supplies said power-down signal to said reverse converter and said separating section for a predetermined period after startup of said transfer controller.

* * * * *